US012775166B2

(12) United States Patent
Zhang

(10) Patent No.: US 12,775,166 B2
(45) Date of Patent: Oct. 27, 2026

(54) DISPLAY SYSTEM HAVING ROTATING REFLECTION ELEMENT

(71) Applicants: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

(72) Inventor: Liang Zhang, Huizhou (CN)

(73) Assignees: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 421 days.

(21) Appl. No.: 18/558,172

(22) PCT Filed: Sep. 4, 2023

(86) PCT No.: PCT/CN2023/116713

§ 371 (c)(1),
(2) Date: Oct. 30, 2023

(87) PCT Pub. No.: WO2024/078188

PCT Pub. Date: Apr. 18, 2024

(65) Prior Publication Data

US 2025/0085536 A1 Mar. 13, 2025

(30) Foreign Application Priority Data

Oct. 11, 2022 (CN) ......................... 202211241172.9

(51) Int. Cl.
*G02B 27/01* (2006.01)

(52) U.S. Cl.
CPC ................................ *G02B 27/0101* (2013.01)

(58) Field of Classification Search
CPC .. G02B 27/0101; G02B 27/42; G02B 26/124; G02B 26/105; H04N 9/3117; H04N 9/3138; G01S 17/42
See application file for complete search history.

(56) References Cited

U.S. PATENT DOCUMENTS

2003/0164901 A1* 9/2003 Ouchi .................. G02B 26/124 348/E9.027
2003/0169376 A1* 9/2003 Ouchi .................. H04N 9/3117 348/E5.142

(Continued)

FOREIGN PATENT DOCUMENTS

CN 101943847 A 1/2011
CN 106507075 A 3/2017

(Continued)

OTHER PUBLICATIONS

International Search Report in International application No. PCT/CN2023/116713, mailed on Nov. 22, 2023.

(Continued)

*Primary Examiner* — Richard J Hong
(74) *Attorney, Agent, or Firm* — PV IP PC; Christopher S. Ruprecht; Wei Te Chung

(57) ABSTRACT

The present application discloses a display system including a display device, a reflection device, and a receiving screen. The display device is configured to display multiple frames of a first image. The reflection device includes a reflection element. The reflection element is configured to reflect a first image. The receiving screen is configured to receive multiple frames of the first image reflected by the reflection element. Adjacent k frames of the first image are reflected to (Continued)

different locations of the receiving screen to form a frame of a second image. k is an integer greater than or equal to 2.

19 Claims, 5 Drawing Sheets

(56) References Cited

U.S. PATENT DOCUMENTS

| | | | | |
|---|---|---|---|---|
| 2005/0231651 | A1* | 10/2005 | Myers | H04N 9/3117 348/E9.027 |
| 2007/0040991 | A1 | 2/2007 | Lee | |
| 2019/0020858 | A1* | 1/2019 | Pappas | H04N 9/3138 |
| 2019/0129196 | A1* | 5/2019 | Masson | G02B 26/105 |
| 2019/0317329 | A1* | 10/2019 | Taylor | G02B 27/42 |
| 2021/0165101 | A1* | 6/2021 | Ikeoh | G01S 17/42 |

FOREIGN PATENT DOCUMENTS

| | | | |
|---|---|---|---|
| CN | 113962876 | A | 1/2022 |
| CN | 115616782 | A | 1/2023 |
| CN | 115840295 | A | 3/2023 |
| JP | H0683998 | A | 3/1994 |
| KR | 20010104596 | A | 11/2001 |
| WO | 2022083336 | A1 | 4/2022 |

OTHER PUBLICATIONS

Written Opinion of the International Search Authority in International application No. PCT/CN2023/116713, mailed on Nov. 22, 2023.

Chinese Office Action issued in corresponding Chinese Patent Application No. 202211241172.9 dated Jan. 12, 2026, pp. 1-12.

* cited by examiner

DISPLAY SYSTEM HAVING ROTATING REFLECTION ELEMENT

CROSS REFERENCE TO RELATED APPLICATIONS

This application claims the priority of International Application No. PCT/CN2023/116713, filed on Sep. 4, 2023, which claims the priority to Chinese Patent Application No. 202211241172.9, filed on Oct. 11, 2022. The entire disclosures of the above applications are incorporated herein by reference.

FIELD OF INVENTION

The present application relates to a field of displays, especially to a display system.

BACKGROUND OF INVENTION

Augmented reality (AR) display devices are a display application for enhancing the display, also known as mixed reality. The principle behind this technology involves the use of computer technology to overlay virtual information onto the real world, allowing real-world environments and virtual objects to be superimposed in real-time on the same screen or space. People can interact with the real world through wearable apparatus such as AR glasses or AR helmets.

Currently, AR display devices have high requirements for specifications like thinness, pixels per inch (PPI), and pixel resolution, which results in larger device sizes and complex manufacturing processes.

SUMMARY OF INVENTION

The present application provides a display system to solve a technical issue of larger size and complex manufacturing processes in conventional AR display devices.

To solve the above issue, technical solutions provided by the present application are as follows:

The embodiment of the present application provides a display system, comprising:

- a display device configured to display multiple frames of a first image;
- a reflection device comprising a reflection element configured to reflect the first image; and
- a receiving screen configured to receive the frames of the first image reflected by the reflection element; wherein adjacent k frames of the first image are reflected to different locations of the receiving screen to form a frame of a second image, k is an integer greater than or equal to 2.

In some embodiments of the present application, when the display device displays the adjacent k frames of the first image, in a horizontal blanking period between adjacent two frames of the first image, the reflection element rotates along a same direction by a predetermined angle.

In some embodiments of the present application, the predetermined angle by which the reflection element rotates in each turn gradually decreases.

In some embodiments of the present application, the predetermined angle is a constant value.

In some embodiments of the present application, in the adjacent k frames of the first image, a row number of pixels of a current frame of the first image is less than a row number of the pixels of a next frame of the first image, or a column number of pixels of a current frame of the first image is less than a column number of the pixels of a next frame of the first image.

In some embodiments of the present application, the reflection element comprises at least one reflection portion, a cross section of the reflection portion is a serration formed by vertical surfaces and tilt surfaces continuously repeated, the tilt surfaces are reflection surfaces; along a rotational direction of the reflection element, and included angles between the tilt surfaces and the vertical surfaces gradually decrease.

In some embodiments of the present application, the reflection element comprises at least one reflection surface, the reflection surface is curved, along a rotational direction of the reflection element, a curvature of the reflection surface gradually increases.

In some embodiments of the present application, the reflection element comprises a reflection surface, after k frames of the first image are reflected each time, the reflection element is restored to an initial location; and

- when a first frame of the first image transmitted by the display device is reflected to a target location of the receiving screen, a location of the reflection element is the initial location.

In some embodiments of the present application, the reflection element comprises a reflection surface, the second image comprises multiple rows of pixels;

- a sequence of the multiple rows of pixels displayed by k frames of the first image corresponding to one of adjacent two frames of the second image is opposite to a sequence of the multiple rows of pixels displayed by k frames of the first image corresponding to the other of the adjacent two frames of the second image, and a rotational direction of the reflection element in one of displaying periods of the adjacent two frames of the second image is opposite to the rotational direction of the reflection element in the other of the displaying periods of the adjacent two frames of the second image.

In some embodiments of the present application, the reflection element comprises a plurality of reflection surfaces, after a current one of the reflection surfaces reflects the first image, the reflection element rotates to a next one of the reflection surfaces.

In some embodiments of the present application, the reflection surfaces are connected to one another to form an annular structure, and a cross section of the reflection element is a regular polygon.

In some embodiments of the present application, the reflection element is a polyhedral prism, or a plurality of planar mirrors are bonded together to form the annular structure.

In some embodiments of the present application, the reflection element rotates at a constant angular velocity.

In some embodiments of the present application, the reflection element further comprises a plurality of connection surfaces, the reflection surfaces and the connection surfaces are connected alternately to one another to constitute an annular structure, a cross section of the reflection element is a serration formed by the reflection surface and the connection surfaces continuously repeated.

In some embodiments of the present application, the reflection surfaces are disposed at intervals, and after the reflection surfaces sequentially reflect k frames of the first image, the reflection element is restored to an initial location; and when a first frame of the first image transmitted by the display device is reflected to a target location of the receiving screen, a location of the reflection element is the initial location.

In some embodiments of the present application, the reflection element comprises a plurality of reflection portions that are the same, each of the reflection portions is a triangular prism.

In some embodiments of the present application, a bottom surface of each of the reflection portions comprises a first edge, a second edge, and a third edge, a length of the first edge is greater than a length of the second edge, the first edge of one of the reflection portions is connected to the second edge of an adjacent one of the reflection portions, and the third edge is a side edge of the reflection surface.

In some embodiments of the present application, the second image comprises a plurality of pixels arranged in an array, and the pixels are arranged in M columns and N rows;

wherein the first image comprises the pixels of M columns and n rows, n<N; or the first image comprises the pixels of m columns and N rows, m<M.

In some embodiments of the present application, the reflection device further comprises a spin axis, and the reflection element is connected to the spin axis.

In some embodiments of the present application, the reflection device further comprises at least one connection member, an end of the connection member is connected to the spin axis, and another end of the connection member is connected to the reflection element.

Advantages

The present application provides a display system further comprising a display device, reflection device and receiving screen. Because the display device divides a frame of the second image into multiple frames of the first image for display, it can reduce a size of the display device and simplify production processes to lower a manufacturing cost of the display device. Also, the reflection element is used to reflect k frames of the first image such that the k frames can be reflected to different locations of the receiving screen to constitute a frame of the second image to achieve normal display of the second image, which fulfills a higher demand to a pixel resolution.

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

In the description of the present application, it is important to understand that the terms "first" and "second" are used solely for descriptive purposes and should not be construed to indicate or imply relative importance or the quantity of the indicated technical features. Thus, features designated as "first" and "second" may explicitly or implicitly include one or more of the features, and therefore should not be considered as limitations on the present application. Furthermore, it should be noted that unless otherwise explicitly defined and limited, the terms "connected" and "coupled" should be broadly interpreted, such as including mechanical connections as well as electrical connections. This could entail direct connections or indirect connections through intermediate means, including connections within two elements. For those skilled in the art, the specific meanings of the above terms in the present invention can be understood in the context of the particular circumstances.

The present application offers a display system, and a detailed explanation will be provided below. It should be clarified that the order of description in the following embodiments does not imply a preferred sequence for the embodiments of the present application.

Figure 1:
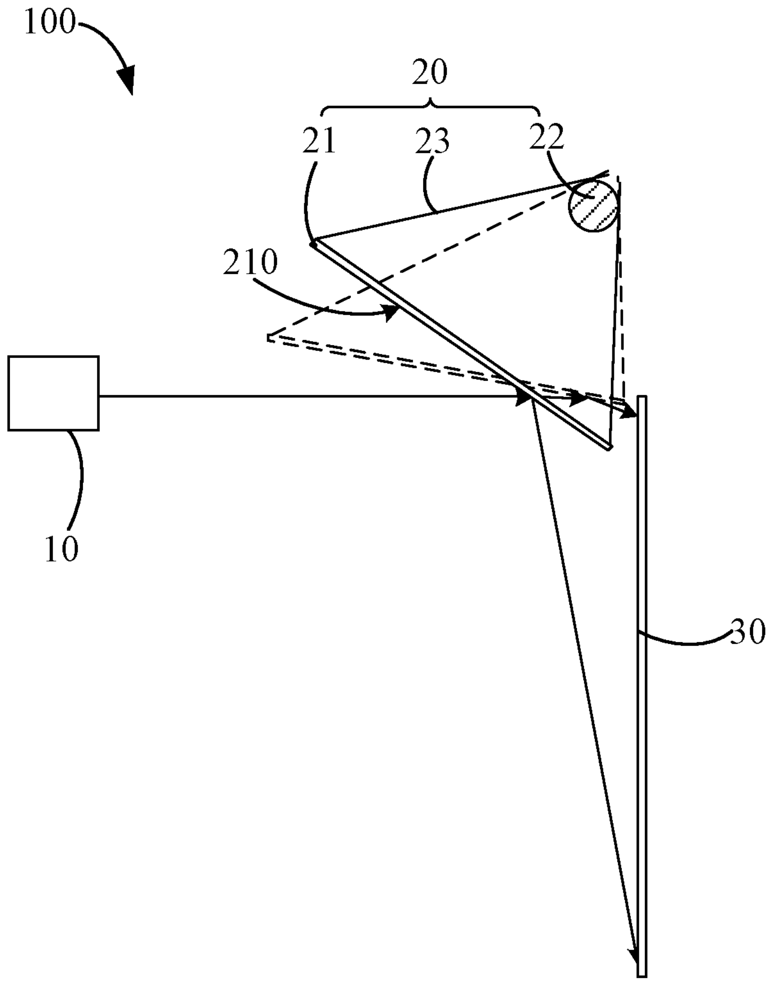
FIG. 1 is a first schematic structural view of a display system provided by the present application.
Figure 2:
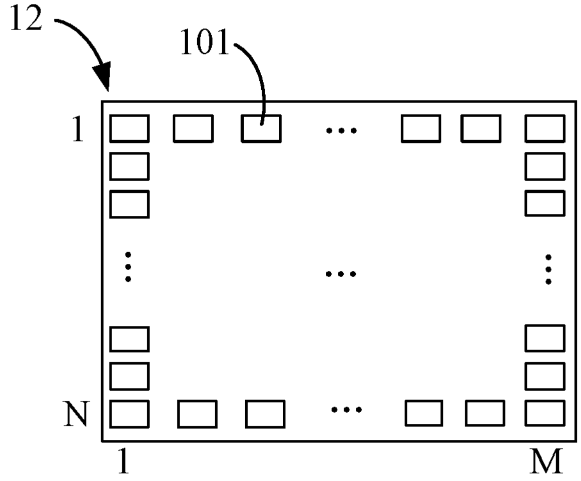
FIG. 2 is a schematic view of pixel arrangement of a second image provided by the present application.
Figure 3:
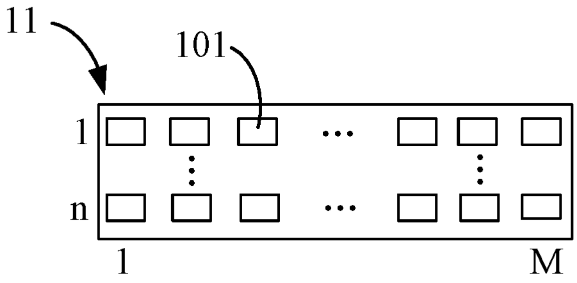
FIG. 3 first is a first schematic view of pixel arrangement of a first image provided by the present application.

With reference to FIGS. 1 to 3, FIG. 1 is a first schematic structural view of a display system provided by the present application; FIG. 2 is a schematic view of pixel arrangement of a second image provided by the present application; FIG. 3 first is a first schematic view of pixel arrangement of a first image provided by the present application. In the embodiment of the present application, the display system 100 comprises a display device 10, a reflection device 20, and a receiving screen 30.

The display device 10 is configured to display multiple frames of a first image 11. The reflection device 20 comprises a reflection element 21. The reflection element 21 is configured to reflect the first image 11. the receiving screen 30 is configured to receive multiple frames of the first image 11 reflected by the reflection element 21. Adjacent k frames of the first image 11 are reflected to different locations of the receiving screen 30 to form a frame of the second image 12. k is an integer greater than or equal to 2.

k can be 2, 5, 10, 20, etc., specifically can be set according to a pixel resolution of the display device 10 and a pixel resolution of the receiving screen 30, and the present application has no limit thereto.

In the embodiment of the present application, the display device 10 divides a frame of the second image 12 into multiple frames of the first image 11 for display, which can reduce a pixel resolution of the display device 10, simplify internal functional structures of the display device 10 to reduce a size of the display device 10, simplify production processes, and lower a manufacturing cost of the display device 10. Also, the reflection element 21 is used to reflect k frames of the first image 11 such that the k frames of the first image 11 can be reflected to different locations of the receiving screen 30 to constitute a frame of the second image 12 to achieve normal display of the second image 12, which fulfills a higher demand to the pixel resolution.

In the embodiment of the present application, the reflective angle of the reflection element 21 is adjustable to reflect k frames of the first image 11 on different locations of the receiving screen 30. In particular, the adjustable reflective angle can be implemented by rotating the reflection element 21. Also, the adjustable can be implemented by rotating an angle at which the display device 10 transmits the first image 11 can be rotated. The present application has no limit thereto.

In the embodiment of the present application, second image 12 comprises a plurality of pixels 101 arranged in an array. The pixels 101 are arranged in M columns and N rows. The pixels 101 can be red pixels, green pixels, blue pixels, white pixels, yellow pixels, etc., and the present application has no limit thereto. wherein a plurality of the pixels 101 can utilize a standard RGB pixel arrangement framework. Of course, the present application has no limits thereto, and can be specifically set according to display requirements of the display system 100.

In some embodiments of the present application, the first image 11 comprises pixels 101 of M columns and n rows, and $n<N$. Namely, a column number of the pixels 101 of each frame of the first image 11 is the same as a column number of the pixels 101 of each frame of the second image 12. Each frame of the first image 11 only displays the pixels 101 of some of the rows of a corresponding frame of the second image 12.

For instance, N can be a multiple of n, a row number of the pixels 101 of each frame of the first image 11 is the same, namely, $N=k\times n$. Of course, N can also be non-multiple of n integer, then row numbers of the pixels 101 of at least two frames of the first image 11 are not the same as long as multiple frames of the first image 11 constituting a frame of the second image 12 is fulfilled.

For instance, a traditional landscape screen with a resolution of full high definition (FHD) is used as an example, a pixels per inch (PPI) of each frame of the second image 12 is 1920×1080. Namely, M=1920, N=1080. Accordingly, each frame of the first image 11 images one (or n) row, namely, the resolution of the display device 10 is 1920×1 (or n), multiple frames of the first image 11 displayed by the display device 10 are reflected to a corresponding location of the receiving screen 30 through the reflection element 21. Then, the display device 10 displays a next frame of the first image 11, and simultaneously adjusts a reflective angle of the reflection element 21. The reflection element 21 reflects the next frame of the first image 11 to another location of the receiving screen 30. The display device 10 continuously forms images and simultaneously adjusts the reflective angle of the reflection element 21 such that an entire second image 12 is displayed on the receiving screen 30.

Furthermore, the traditional landscape screen with the resolution of FHD is used as an example, when a refresh rate of the receiving screen 30 is 60 Hz, a refresh rate of the display device 10 is required to be set as (60×1080/n) Hz. Multiple frames of the first image 11 transmitted by the display device 10 are sequentially reflected to the receiving screen 30 through the reflection element 21 to be able to completely display a second image 12 with a resolution of 1920×1080 and a refresh rate of 60 Hz.

Figure 4:
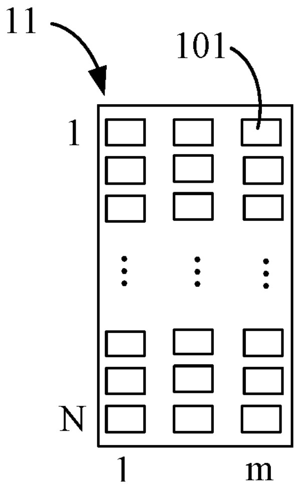
FIG. 4 is a second schematic view of pixel arrangement of the first image provided by the present application.

In some embodiments of the present application, with reference to FIGS. 1, 2 and 4, FIG. 4 is a second schematic view of pixel arrangement of the first image provided by the present application. A difference of the first image 11 in FIG. 4 from the first image 11 in FIG. 3 is that in the embodiment of the present application, the first image 11 comprises the pixels 101 of m columns and N rows. Namely, a row number of the pixels 101 of each frame of the first image 11 is the same as a row number of the pixels 101 of each frame of the second image 12. Each frame of the first image 11 only displays the pixels 101 of some columns of a corresponding frame of the second image 12.

For instance, M can be a multiple of m, a column number of the pixels 101 of each frame of the first image 11 is the same, namely, $M=k\times m$. Of course, M can also be non-multiple of m, then column numbers of the pixels of at least two frames of the first image 11 are not the same as long as multiple frames of the first image 11 constituting a frame of the second image 12 is fulfilled.

Similarly, the traditional landscape screen with a resolution of FHD is used as an example, when a refresh rate of the receiving screen 30 is 60 Hz, then a refresh rate of the display device 10 is required to be set as (60×1920/m) Hz. Multiple frames of the first image 11 transmitted by the display device 10 are reflected to the receiving screen 30 through the reflection element 21 to be able to completely display the second image 12 with a resolution of 1920×1080 and a refresh rate of 60 Hz.

In the embodiment of the present application, when the display device 10 displays k frames of the first image 11 corresponding to the same frame of the second image 12, in a horizontal blanking period between adjacent two frames of the first image 11, the reflection element 21 rotates by a predetermined angle along a same direction.

A range of the predetermined angle can be set according to a value of k. For instance, the predetermined angle can be 1 degree, 5 degrees, 10 degrees, etc., and the present application has no limit thereto. The horizontal blanking period refers to a time period, between adjacent two frames of the first image 11, in which the display device 10 displays no image.

The embodiment of the present application, by rotating the reflection element 21, can adjust the reflective angle of the reflection element 21 to reflect multiple frames of the first image 11 on different locations of the receiving screen 30. Furthermore, rotating the reflection element 21 in the horizontal blanking period between adjacent two frames of the first image 11, can fully utilize the horizontal blanking period and improve the refresh rate of the display device 10. Also, because the display device 10 displays no first image 11 in the horizontal blanking period, it can prevent errors when the reflection element 21 reflects adjacent two frames of the first image 11.

With further reference to FIG. 1, the reflection device 20 can further comprise a spin axis 22. The reflection element 21 is connected to the spin axis 22. The spin axis 22 is configured to drive the reflection element 21 to rotate.

In particular, the reflection device 20 can further comprise at least one connection member 23. An end of the connection member 23 is connected to the spin axis 22, and another end of the connection member 23 is connected to the reflection element 21. The connection member 23 securely fastens the reflection element 21 on the spin axis 22 such that the reflection element 21 rotates with rotation of the spin axis 22.

The spin axis 22 can rotate clockwise, and can also rotate counterclockwise. A rotating speed of the spin axis 22 can be adjusted. In particular, display system 100 can further comprise a driver device (not shown in the figures). Setting the rotating speed of the spin axis 22 in the driver device can automatically control rotation of the reflection element 21.

In the embodiment of the present application, the reflection element 21 comprises at least one reflection surface 210. For instance, the reflection element 21 can comprise one reflection surface 210, two reflection surfaces 210, or more reflection surfaces 210. Each reflection surface 210 is configured to reflect k frames of the first image 11 corresponding to a frame of the second image 12.

With reference to FIG. 1, the reflection element 21 comprises a reflection surface 210. In some embodiments, k frames of the first image 11 corresponding to each frame of the second image 12 display according to a sequence from pixels 101 of a first row to pixels 101 of a $N^{th}$ row. Each time after k frames of the first image 11 are reflected, the reflection element 21 is restored to an initial location.

The initial location of the reflection element 21 depends on a relative location relationship among the display device 10, the reflection element 21, and the receiving screen 30. In the embodiment of the present application, the reflection element 21 is disposed between the display device 10 and the receiving screen 30 and is located above the display device 10 and the receiving screen 30. Rotating the reflection element 21 adjusts the reflective angle of the reflection element 21. When the first frame of the first image 11 transmitted by the display device 10 is reflected to a target location of the receiving screen 30, the location of the reflection element 21 is the initial location of the reflection element 21. Accordingly, a rotating speed of the reflection element 21 can also be adjusted and recorded according to a location of the receiving screen 30 on which each frame of the first image 11 is reflected, which is not repeatedly described here.

In another some embodiments, a sequence of the multiple rows of pixels 101 displayed by k frames of the first image 11 corresponding to one of adjacent two frames of the second image 12 is opposite to a sequence of the multiple rows of pixels 101 displayed by k frames of the first image 11 corresponding to the other of the adjacent two frames of the second image 12, a rotational direction of the reflection element 21 in one of displaying periods of the adjacent two frames of the second image 12 is opposite to a rotational direction of the reflection element 21 in the other of the displaying periods of the adjacent two frames of the second image 12.

For instance, when k frames of the first image 11 corresponding to the current frame of the second image 12 are displayed in a sequence from the pixels 101 of the first row to the pixels 101 of the $N^{th}$ row, and k frames of the first image 11 corresponding to a next frame of the second image 12 are displayed according to a sequence from the pixels 101 of the $N^{th}$ row to the pixels 101 of the first row. Then, when k frames of the first image 11 corresponding to the current frame of the second image 12 are displayed, the reflection element 21 can clockwise rotate by a predetermined angle in each turn. When k frames of the first image 11 corresponding to a next frame of the second image 12 are displayed, the reflection element 21 can counterclockwise rotate by a predetermined angle in each turn. As such, each time after k frames of the first image 11 are reflected, the reflection element 21 is not required to be restored to the initial location, which simplifies a process of the reflection element 21 adjusting the reflective angle.

In the embodiment of the present application, the reflection surface 210 can be a plane structure as shown in FIG. 1. The reflection surface 210 can be a relief structure, which will be described specifically in the following embodiments.

Figure 5:
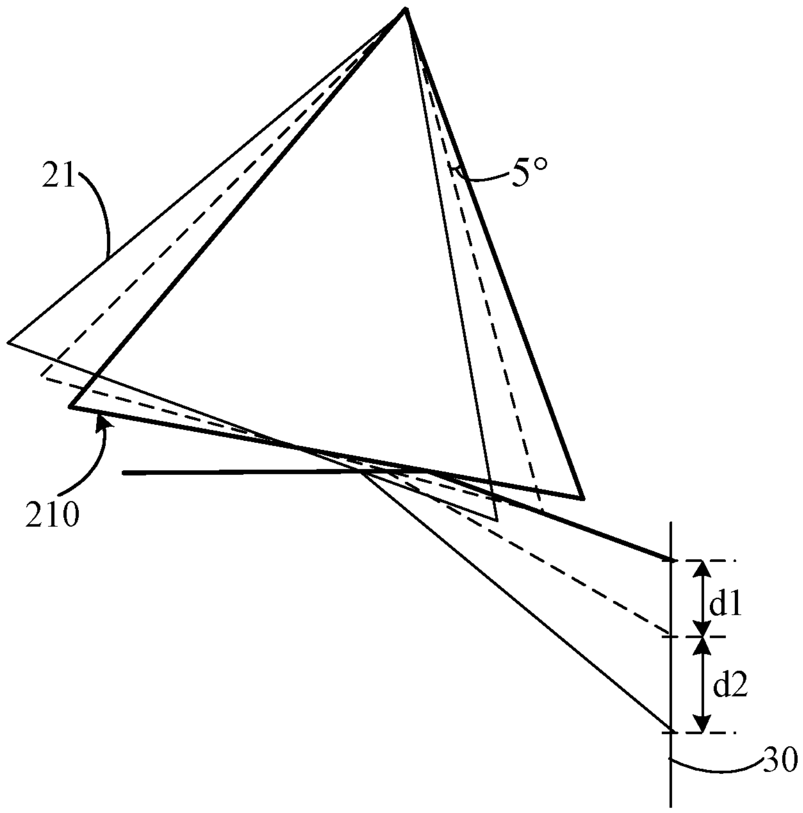
FIG. 5 is a schematic view of a principle of imaging of a display system provided by the present application.

With reference to FIG. 1, the reflection surface 210 is a plane, and the reflection element 21 can be a planar mirror. With reference to FIG. 5, FIG. 5 is a schematic view of a principle of imaging of a display system provided by the present application.

With reference to FIG. 5, during rotation of the reflection element 21, a reflective angle of the reflection element 21 to each frame first image 11 is different such that k frames of the first image 11 are imaged in different locations of the receiving screen 30.

When the reflection element 21 rotates by the same angle each time, a predetermined angle of 5 degrees is used as an example for explanation, a variation distance of a display location of the receiving screen 30 is different, namely, a first distance d1 is unequal to a second distance d2, and the second distance d2 is greater than the first distance d1. Therefore, the second image 12 displayed on the receiving screen 30 has an image distortion.

As such, in some embodiments of the present application, when the display device 10 displays k frames of the first image 11 corresponding to the same frame of the second image 12, the predetermined angle by which the reflection element 21 rotates in each turn gradually decreases. As shown in FIG. 5, with rotation of the reflection element 21, the second distance d2 is greater than the first distance d1. Therefore, to guarantee that the second distance d2 is equal to the first distance d1, a reflective angle of each frame of the first image 11 on the reflection surface 210 needs to be adjusted.

In the embodiment of the present application, when the display device 10 displays k frames of the first image 11, the predetermined angle by which the reflection element 21 rotates in each turn is set to gradually decrease, which can reduce an incident angle of a next frame of the first image 11 on the reflection surface 210 to reduce a reflective angle of the next frame of the first image 11 to further reduce the second distance d2 such that the second distance d2 is equal to the first distance d1 to improve a display quality of the second image 12.

In some embodiments of the present application, the predetermined angle is a constant value, in k frames of the first image 11 corresponding to the same frame of the second image 12, a row number of pixels of a current frame of the first image 11 is less than a row number of pixels of a next frame of the first image 11, or a pixel column number of a current frame of the first image 11 is less than a pixel column number of a next frame of the first image 11.

In particular, when the display device 10, according to a unit of one (n) row, divides each frame of the second image 12 into multiple frames of the first image 11 first display, a row number of the pixels of a current frame of the first image 11 is less than a row number of the pixels of a next frame of the first image 11. When the display device 10, according to a unit of one (n) column, divides each frame of the second image 12 into multiple frames of the first image 11 for display, a column number of the pixels of the current frame of the first image 11 is less than a column number of the pixels of a next frame of the first image 11.

It can be understood that when the reflection surface 210 is a plane and the predetermined angle is a constant value, the second distance d2 is greater than the first distance d1. Therefore, setting a row (column) number of the pixels of the current frame of the first image 11 being less than a row (column) number of the pixels of a next frame of the first image 11 allows more images to be displayed in a range of the second distance d2 on the receiving screen 30 to compensate the image distortion due to the second distance d2 being greater than the first distance d1.

Figure 6:
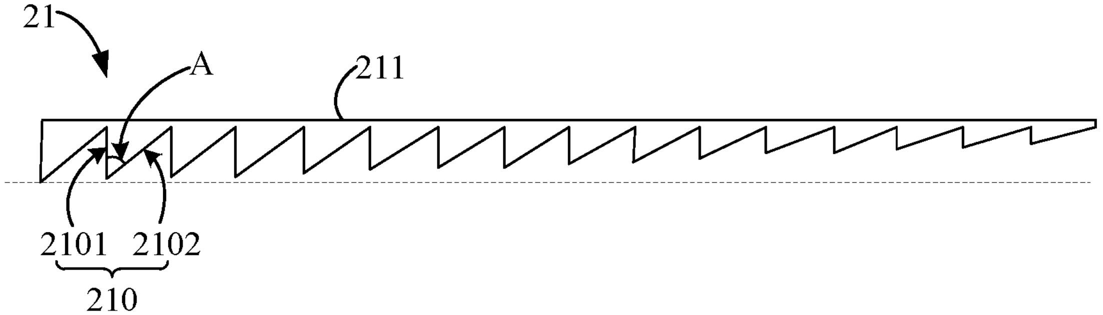
FIG. 6 is a first schematic structural view of a reflection element provided by the present application.

In some embodiments of the present application, with reference to FIG. 6, FIG. 6 is a first schematic structural view of a reflection element provided by the present application. Different from the reflection element 21 shown in FIG. 1, in the embodiment of the present application, the reflection element 21 comprises at least one reflection portion 211. The reflection surface 210 of the reflection portion 211 is relief-shaped. A cross section of the reflection portion 211 is a serration formed by vertical surfaces 2101 and tilt surfaces 2102 continuously repeated. The tilt surfaces 2102 constitute the reflection surface 210. Along the rotational direction of the reflection element 21, included angles A between the tilt surfaces 2102 and the vertical surfaces 2101 gradually decrease.

Similarly, as shown in FIG. 5, when the reflection surface 210 is a plane and the predetermined angle is a constant value, the second distance d2 is greater than the first distance d1. It can be understood that when the reflection element 21 rotates by different angles, reflected locations of the first image 11 on the same reflection surface 210 are different. In the embodiment of the present application, along a rotational direction of the reflection element 21, included angles A defined between the tilt surfaces 2102 and the vertical surfaces 2101 gradually decrease, on the basis of keeping the predetermined angle constant, to make the reflective angle at which the reflection surface 210 reflects the first image 11 changed each time such that the second distance d2 is equal to the first distance d1 when the reflection element 21 rotates by the same angle each time, which also simplifies an adjusting process of the reflection element 21 adjusting the reflective angle.

It should be explained that in the embodiment of the present application, the tilt surfaces 2102 on each of the reflection portions 211 can be a number of k such that with rotation of the reflection element 21, each of the tilt surfaces 2102 reflects a frame of the first image 11. Of course, when the value of k is greater, the predetermined angle can also be adjusted to make each of the tilt surfaces 2102 sequentially reflects multiple frames of the first image 11.

Figure 7:
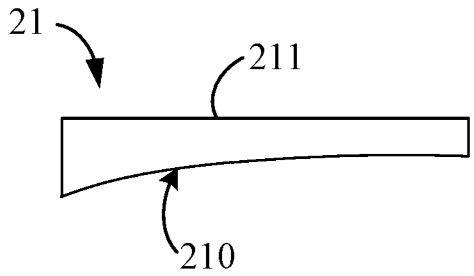
FIG. 7 is a second schematic structural view of a reflection element provided by the present application.

In some embodiments of the present application, with reference to FIG. 7, FIG. 7 is a second schematic structural view of a reflection element provided by the present application. Different from the reflection element 21 of FIG. 1, in the embodiment of the present application, the reflection element 21 comprises at least one the reflection portion 211. The reflection surface 210 of the reflection portion 211 is curved, and along a rotational direction of the reflection element 21, a curvature of the reflection surface 210 gradually increases.

Similarly, as shown in FIG. 5, when the reflection surface 210 is a plane and the predetermined angle is a constant value, the second distance d2 is greater than the first distance d1. It can be understood that when the reflection element 21 rotates by different angles, reflected locations of the first image 11 on the same reflection surface 210 are different. The embodiment of the present application sets the reflection surface 210 as an arc surface. Although the reflection element 21 rotates by the same predetermined angle each time, because the curvature of the reflection surface 210 gradually increases along the rotational direction of the reflection element 21, an incident angle of a next frame of the first image 11 on the reflection surface 210 can be reduced to reduce a reflective angle of a next frame of the first image 11 to further reduce the second distance d2 such that the second distance d2 is equal to the first distance d1, which improves a display quality of the second image 12.

Figure 8:
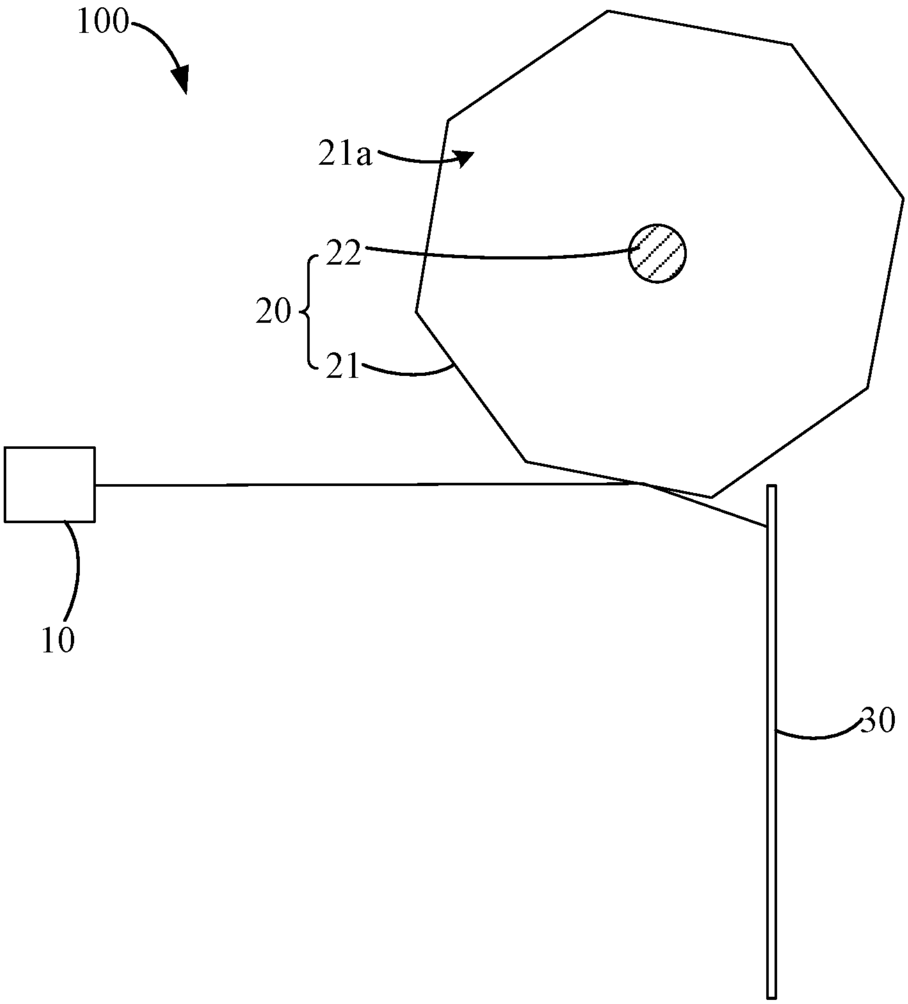
FIG. 8 is a second schematic structural view of a display system provided by the present application.

With reference to FIG. 8, FIG. 8 is a second schematic structural view of a display system provided by the present application. A difference from the display system 100 shown in FIG. 1 is in that in the embodiment of the present application, the reflection element 21 comprises the reflection surfaces 210. After the current reflection surface 210 reflects a corresponding one of the first image 11, the reflection element 21 rotates to a next one of the reflection surfaces 210.

In particular, each reflection surface 210 can be configured to sequentially reflect k frames of the first image 11. After the current reflection surface 210 reflects k frames of the first image 11, the reflection element 21 rotates to a next one of the reflection surfaces 210.

In some embodiments, the reflection surfaces 210 are connected to one other to constitute an annular structure. A cross section **21*a* of the reflection element 21** is regular polygon.

The reflection element 21 can be polyhedral prism. For instance, the reflection element 21 is a triangular prism, tetrahedral prism, hexahedral prism, octahedral prism, etc. Each side surface of the polyhedral prism is one reflection surface 210. The spin axis 22 can extend through a top surface or bottom surface of the polyhedral prism to be connected to the polyhedral prism. Also, the polyhedral prism can also be a hollow structure to reduce a weight of the reflection element 21.

Of course, the reflection element 21 can also be an annular structure formed by planar mirrors bonded together. The present application has no limit thereto.

In the reflection element 21 of the embodiment of the present application, the reflection surfaces 210 form an annular structure. The reflection element 21 can be rotated at a constant angular velocity without restoring the reflection element 21 to the initial location to simplify the process of the reflection element 21 adjusting the reflective angle. For instance, when the reflection element 21 comprises the reflection surfaces 210 of a number p, to display a second image 12 with a resolution of 1920 RGB×1080 and a refresh rate of 60 Hz, a rotating speed of the reflection element 21 is 60/p revolutions per second.

In some embodiments, to reduce a size of the display system 100, the reflection element 21 can be also set as only a part of the reflection element 21 in FIG. 8.

In some embodiments, the reflection surfaces 210 can be disposed at intervals, and be connected to the same spin axis 22. The spin axis 22 drives the reflection surfaces 210 to rotate simultaneously. After the reflection surfaces 210 sequentially reflect K frames of the first image 11, the reflection surfaces 210 can be restored to the initial location to re-rotate.

It should be explained that when the reflection element 21 comprises reflection surfaces 210, each reflection surface 210 can be disposed referring to the structure of any reflection surface 210 of the above embodiments, which is not repeatedly described here.

Figure 9:
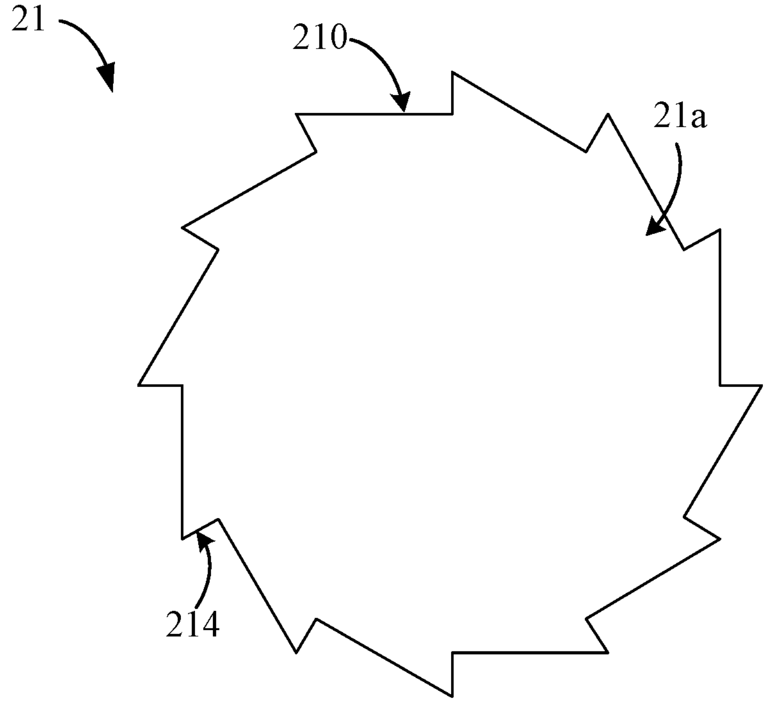
FIG. 9 is a third schematic structural view of the reflection element provided by the present application.

With reference to FIG. 9, FIG. 9 is a third schematic structural view of the reflection element provided by the present application. Different from the reflection element 21 in display system 100 in FIG. 8, in the embodiment of the present application, the reflection element 21 further comprises a plurality of connection surfaces 214. The reflection surfaces 210 and the connection surfaces 214 are connected alternately to one another to constitute an annular structure. A cross section of the reflection element 21 is a serration formed by the reflection surface 210 and the connection surfaces 214 continuously repeated. The reflection element 21 can rotate at a constant angular velocity.

The reflection element 21 can be obtained by cutting a cylinder or a polyhedral prism. The reflection element 21 can be a hollow structure.

The embodiment of the present application designs the reflection element 21 as a pinwheel-shaped structure and only reserves some of the reflection surfaces 210 for reflection. Under a requirement for the same size, a number of the reflection surfaces 210 can increase. Within a rotation period of the reflection element 21, a number of frames of the first image 11 reflected increases. As such, under a condition of the same angular velocity of rotation, a refresh rate of display can increase.

Figure 10:
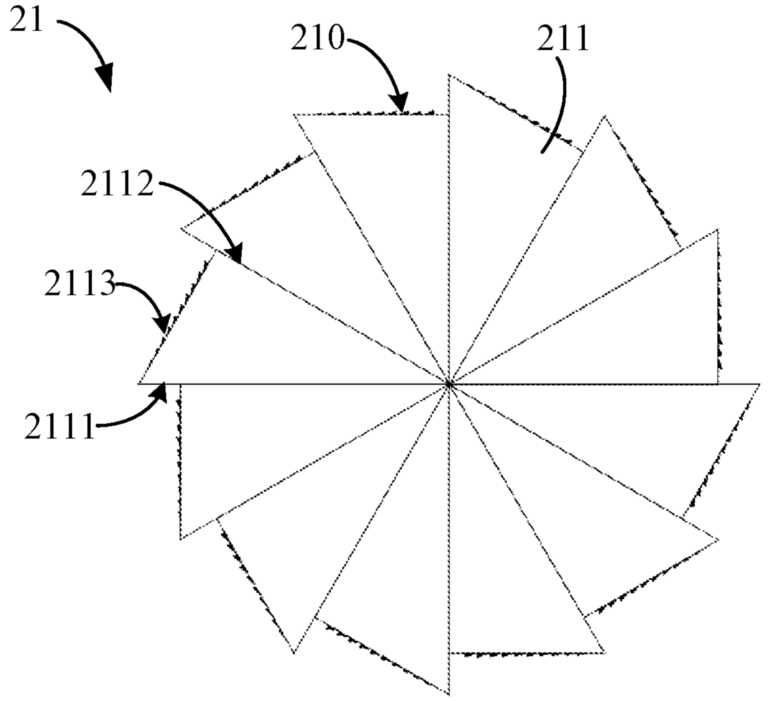
FIG. 10 is a fourth schematic structural view of the reflection element provided by the present application.

Furthermore, with reference to FIG. 10, FIG. 10 is a fourth schematic structural view of the reflection element provided by the present application. Different from the reflection element 21 in the display system 100 as shown in FIG. 9, in the embodiment of the present application, in some embodiments of the present application, the reflection element 21 comprises a plurality of the reflection portions 211 that are the same. Each of the reflection portions 211 is a triangular prism. A bottom surface of each reflection portion 211 comprises a first edge 2111, a second edge 2112, and a third edge 2113 connected to the first edge 2111 and the second edge 2112. A length of the first edge 2111 is greater than a length of the second edge 2112. The first edge 2111 of each of the reflection portions 211 is connected to the second edge 2112 of an adjacent one of the reflection portions 211. The third edge 2113 is a side edge of the reflection surface 210.

The same reflection portions 211 can be stacked together according to the spin axis as a center, to form a pinwheel-shaped prism. The embodiment of the present application employs a plurality of triangular prisms arranged circularly to form one reflection element 21, which is structurally simple and simplifies manufacturing processes.

The display system provided by the embodiment of the present application is described in detail as above. In the specification, the specific examples are used to explain the principle and embodiment of the present application. The above description of the embodiments is only used to help understand the method of the present application and its spiritual idea. Meanwhile, for those skilled in the art, according to the present idea of invention, changes will be made in specific embodiment and application. In summary, the contents of this specification should not be construed as limiting the present application.

What is claimed is:

1. A display system, comprising:

a display device configured to display multiple frames of a first image;

a reflection device comprising a reflection element configured to reflect the first image; and a receiving screen configured to receive the frames of the first image reflected by the reflection element; wherein adjacent k frames of the first image are reflected to different locations of the receiving screen to form a frame of a second image, k is an integer greater than or equal to 2;

wherein the reflection element comprises a reflection surface, the second image comprises multiple rows of pixels;

a sequence of the multiple rows of pixels displayed by k frames of the first image corresponding to one of adjacent two frames of the second image is opposite to a sequence of the multiple rows of pixels displayed by k frames of the first image corresponding to the other of the adjacent two frames of the second image, and a rotational direction of the reflection element in one of displaying periods of the adjacent two frames of the second image is opposite to the rotational direction of the reflection element in the other of the displaying periods of the adjacent two frames of the second image.

2. The display system according to claim 1, wherein when the display device displays the adjacent k frames of the first image, in a horizontal blanking period between adjacent two frames of the first image, the reflection element rotates along a same direction by a predetermined angle.

3. The display system according to claim 2, wherein the predetermined angle by which the reflection element rotates in each turn gradually decreases.

4. The display system according to claim 2, wherein the predetermined angle is a constant value.

5. The display system according to claim 4, wherein in the adjacent k frames of the first image, a row number of pixels of a current frame of the first image is less than a row number of the pixels of a next frame of the first image, or a column number of pixels of a current frame of the first image is less than a column number of the pixels of a next frame of the first image.

6. The display system according to claim 4, wherein the reflection element comprises at least one reflection portion, a cross section of the reflection portion is a serration formed by vertical surfaces and tilt surfaces continuously repeated, the tilt surfaces are reflection surfaces; and along a rotational direction of the reflection element, included angles between the tilt surfaces and the vertical surfaces gradually decrease.

7. The display system according to claim 4, wherein the reflection element comprises at least one reflection surface, the reflection surface is curved, along a rotational direction of the reflection element, a curvature of the reflection surface gradually increases.

8. The display system according to claim 1, wherein the reflection element comprises a reflection surface, after k frames of the first image are reflected each time, the reflection element is restored to an initial location; and when a first frame of the first image transmitted by the display device is reflected to a target location of the receiving screen, a location of the reflection element is the initial location.

9. The display system according to claim 1, wherein the reflection element comprises a plurality of reflection surfaces, after a current one of the reflection surfaces reflects the first image, the reflection element rotates to a next one of the reflection surfaces.

10. The display system according to claim 9, wherein the reflection surfaces are connected to one another to form an annular structure, and a cross section of the reflection element is a regular polygon.

11. The display system according to claim 10, wherein the reflection element is a polyhedral prism, or a plurality of planar mirrors are bonded together to form the annular structure.

12. The display system according to claim 10, wherein the reflection element rotates at a constant angular velocity.

13. The display system according to claim 9, wherein the reflection element further comprises a plurality of connection surfaces, the reflection surfaces and the connection surfaces are connected alternately to one another to constitute an annular structure, a cross section of the reflection element is a serration formed by the reflection surface and the connection surfaces continuously repeated.

14. The display system according to claim 9, wherein the reflection surfaces are disposed at intervals, and after the reflection surfaces sequentially reflect k frames of the first image, the reflection element is restored to an initial location; and when a first frame of the first image transmitted by the display device is reflected to a target location of the receiving screen, a location of the reflection element is the initial location.

15. The display system according to claim 9, wherein the reflection element comprises a plurality of reflection portions that are the same, each of the reflection portions is a triangular prism.

16. The display system according to claim 15, wherein a bottom surface of each of the reflection portions comprises a first edge, a second edge, and a third edge, a length of the first edge is greater than a length of the second edge, the first edge of one of the reflection portions is connected to the second edge of an adjacent one of the reflection portions, and the third edge is a side edge of the reflection surface.

17. The display system according to claim 1, wherein the pixels of the second image are arranged in an array, and the pixels are arranged in M columns and N rows;

wherein the first image comprises the pixels of M columns and n rows, $n<N$; or the first image comprises the pixels of m columns and N rows, $m<M$.

18. The display system according to claim 1, wherein the reflection device further comprises a spin axis, and the reflection element is connected to the spin axis.

19. The display system according to claim 18, wherein the reflection device further comprises at least one connection member, an end of the connection member is connected to the spin axis, and another end of the connection member is connected to the reflection element.

* * * * *